United States Patent
Lee

(10) Patent No.: US 10,091,827 B2
(45) Date of Patent: Oct. 2, 2018

(54) ELECTRONIC APPARATUS, METHOD OF SUPPORTING WIRELESS CONNECTION, IMAGE FORMING APPARATUS, AND METHOD OF WIRELESS CONNECTION

(71) Applicant: S-PRINTING SOLUTION CO., LTD., Suwon-si, Gyeonggi-Do (KR)

(72) Inventor: Sang-min Lee, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/322,005

(22) Filed: Jul. 2, 2014

(65) Prior Publication Data

US 2015/0146241 A1    May 28, 2015

(30) Foreign Application Priority Data

Nov. 22, 2013 (KR) .................. 10-2013-0143021

(51) Int. Cl.
| | |
|---|---|
| *G06F 15/00* | (2006.01) |
| *H04W 76/14* | (2018.01) |
| *H04N 1/00* | (2006.01) |
| *H04N 1/32* | (2006.01) |
| *H04W 48/20* | (2009.01) |
| *H04W 8/00* | (2009.01) |

(52) U.S. Cl.
CPC ........ *H04W 76/14* (2018.02); *H04N 1/00103* (2013.01); *H04N 1/00204* (2013.01); *H04N 1/324* (2013.01); *H04N 2201/0036* (2013.01); *H04N 2201/0041* (2013.01); *H04N 2201/0094* (2013.01); *H04W 8/005* (2013.01); *H04W 48/20* (2013.01)

(58) Field of Classification Search
CPC ............... H04W 76/023; H04W 48/20; H04N 2201/0094
USPC ....................................... 358/1.15
See application file for complete search history.

(56) References Cited

U.S. PATENT DOCUMENTS

| | | | |
|---|---|---|---|
| 2005/0066072 A1* | 3/2005 | Nakamura | G06F 3/1203 710/8 |
| 2006/0002352 A1* | 1/2006 | Nakamura | H04L 41/0816 370/338 |
| 2012/0038948 A1* | 2/2012 | Park | 358/1.15 |
| 2013/0107318 A1* | 5/2013 | Yamada | G06F 3/1207 358/1.15 |

* cited by examiner

*Primary Examiner* — Saeid Ebrahimi Dehkordy
(74) *Attorney, Agent, or Firm* — Staas & Halsey LLP

(57) ABSTRACT

A method of supporting wireless connection of an electronic apparatus includes searching an image forming apparatus that is not connected to a wireless network, when the image forming apparatus is searched, releasing a link with an Access Point (AP) and forming a link with the searched image forming apparatus, and transmitting pre-stored AP information to the image forming apparatus such that the image forming apparatus forms a link with the AP.

26 Claims, 9 Drawing Sheets

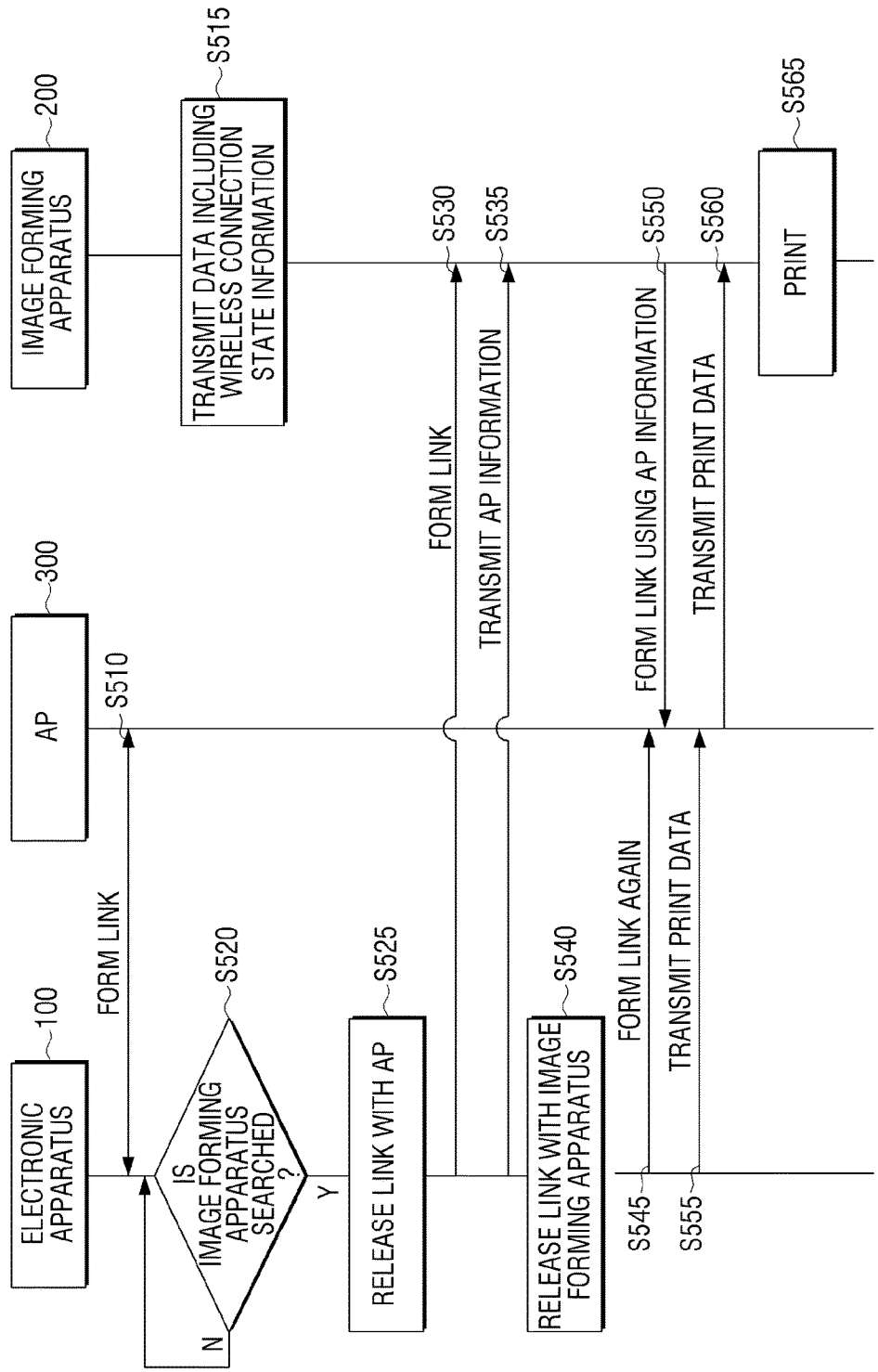

ELECTRONIC APPARATUS, METHOD OF SUPPORTING WIRELESS CONNECTION, IMAGE FORMING APPARATUS, AND METHOD OF WIRELESS CONNECTION

CROSS-REFERENCE TO RELATED APPLICATIONS

This application claims priority under 35 U.S.C. § 119 from Korean Patent Application No. 10-2013-0143021, filed in the Korean Intellectual Property Office on Nov. 22, 2013, the disclosure of which is incorporated herein by reference in its entirety.

BACKGROUND OF THE INVENTION

1. Field of the Invention

The present general inventive concept relates to an electronic apparatus, a method of supporting wireless connection, an image forming apparatus, and a method of wireless connection, and more particularly, to an electronic apparatus capable of performing Access Point (AP) connection of an image forming apparatus easily, a method of supporting wireless connection, an image forming apparatus, and a method of wireless connection.

2. Description of the Related Art

A conventional image forming apparatus is an apparatus that prints print data generated by a print control terminal device such as a computer on a recording paper. Examples of an image forming apparatus include copy machine, printer, fax machine, and a Multi-Function Peripheral (MFP) that performs the above functions in a single device, but is not limited thereto.

A recent image forming apparatus supports wireless connection, and connects to a network via wireless connection. In order to connect to a network, an image forming apparatus should be connected to an AP.

However, general users may experience difficulty when attempting to connect an image forming apparatus to an AP. For example, in order to connect an image forming apparatus to an AP, a user needs to know the network name of the AP (for example, Service Set Identifier (SSID)) and a network key. However, the user may not have access to such information.

In addition, it is very difficult and time-consuming for a user to connect a new image forming apparatus to an AP, since the job of AP connection is usually performed by a PC setting engineer or an Internet setting engineer.

SUMMARY OF THE INVENTION

The present general inventive concept relates to an electronic apparatus that searches to find an image forming apparatus that is not connected to a wireless network and transmits information on an AP to an image forming apparatus so that the image forming apparatus may be connected to the AP, a method of supporting wireless connection, an image forming apparatus, and a method of wireless connection.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a method of supporting wireless connection of an electronic apparatus according to an exemplary embodiment includes searching an image forming apparatus that is not connected to a wireless network, when the image forming apparatus is searched, releasing a link with an Access Point (AP) and forming a link with the searched image forming apparatus, and transmitting pre-stored AP information to the image forming apparatus such that the image forming apparatus forms a link with the AP.

The searching an image forming apparatus may include scanning Soft AP of at least one image forming apparatus at predetermined intervals, and receiving Information Element (IE) data from the scanned Soft AP and checking wireless connection state information included in the IE data and searching the image forming apparatus from among the at least one image forming apparatus.

The searching an image forming apparatus may include performing WiFi Direct communication with at least one image forming apparatus, receiving apparatus registration information from the at least one image forming apparatus that performs WiFi Direct communication, and searching the image forming apparatus from among the at least one image forming apparatus using wireless connection state information included in the apparatus registration information.

The method may include, when the image forming apparatus is searched, displaying a user interface screen to inquire whether to connect the image forming apparatus to the AP, and receiving a user command to connect the image forming apparatus to the AP through the user interface screen.

The method may include, when the pre-stored AP information is transmitted to the image forming apparatus, releasing a link with the image forming apparatus and forming a link with the AP again.

The method may include receiving apparatus identification information from the image forming apparatus and storing the received apparatus identification information, when the pre-stored AP information is transmitted to the image forming apparatus, searching at least one wireless communication apparatus that is connected to the AP, and checking whether the image forming apparatus is connected to the AP by searching the image forming apparatus from among the at least one wireless communication apparatus using the apparatus identification information.

The method may further include, when IP information is received from the image forming apparatus that is connected to the AP, generating a printer port with respect to the image forming apparatus using the IP information and installing a printer driver with respect to the image forming apparatus.

The method may further include, when a print command with respect to print data is received transmitting the print data to the image forming apparatus that is connected to the AP.

The forming a link with the searched image forming apparatus may include forming a link with the image forming apparatus using one of WiFi Direct, Bluetooth, Soft AP, and ad-hoc mode.

The AP information may include at least one of Service Set Identifier (SSID), network key information and security information.

The foregoing and/or other features and utilities of the present general inventive concept may also be achieved by providing an electronic apparatus according to an exemplary embodiment includes a storage store AP information, a searcher search an image forming apparatus that is not connected to a wireless network, a communicator, when an image forming apparatus is searched by the searcher, release a link with the AP and form a link with the searched image forming apparatus, and a controller control the communicator to transmit the AP information that is necessary to form a link with the AP to the image forming apparatus.

The searcher, when Soft AP of at least one image forming apparatus is scanned through the communicator at predetermined intervals, may receive IE data from the scanned Soft AP, check wireless connection state information included in the IE data and search the image forming apparatus from among the at least one image forming apparatus.

The searcher, when apparatus registration information is received from the at least one image forming apparatus that performs WiFi Direct communication, may search the image forming apparatus from among the at least one image forming apparatus using wireless connection state information included in the apparatus registration information.

The apparatus may further include a user interface configured to, when the image forming apparatus is searched, display a user interface screen to inquire whether to connect the image forming apparatus to the AP, and the controller, when a user command to connect the image forming apparatus to the AP is received, may control the controller to transmit the AP information to the image forming apparatus.

The controller, when the AP information is transmitted to the image forming apparatus, may control the communicator to release a link with the image forming apparatus and form a link with the AP again.

The communicator may receive apparatus identification information from the searched image forming apparatus, and the controller, when the AP information is transmitted to the image forming apparatus, may control the communicator to search at least one wireless communication apparatus that is connected to the AP, and check whether the image forming apparatus is connected to the AP by searching the image forming apparatus from among the at least one wireless communication apparatus using the apparatus identification information The controller, when IP information is received from the image forming apparatus that is connected to the AP, may generate a printer port with respect to the image forming apparatus using the IP information and install a printer driver with respect to the image forming apparatus.

The apparatus may include a job generator configured to generate print data, and the controller, when a print command with respect to the print data is received, may control the communicator to transmit the print data to the image forming apparatus that is connected to the AP.

The AP information may include at least one of SSID, network key information and security information.

The foregoing and/or other features and utilities of the present general inventive concept may also be achieved by providing a method of wireless connection of an image forming apparatus that is not connected to a wireless network according to an exemplary embodiment includes forming a link with an electronic apparatus, receiving AP information from the electronic apparatus, and forming a link with an AP corresponding to the AP information using the AP information.

The method may further include transmitting IE data including wireless connection state information with respect to the image forming apparatus through Soft AP.

The method may further include transmitting apparatus registration information including wireless connection state information with respect to the image forming apparatus using WiFi Direct communication.

The AP information may include at least one of SSID, network key information and security information.

The foregoing and/or other features and utilities of the present general inventive concept may also be achieved by providing an image forming apparatus according to an exemplary embodiment includes a communicator o form a link with an electronic apparatus and a controller, when AP information is received from the electronic apparatus through the communicator, control the communicator to form a link with an AP corresponding to the AP information using the AP information.

The apparatus may further include Soft AP configured to transmit IE data including wireless connection state information with respect to the image forming apparatus.

The controller may control the communicator to transmit apparatus registration information including wireless connection state information with respect to the image forming apparatus using WiFi Direct communication.

The foregoing and/or other features and utilities of the present general inventive concept may also be achieved by providing wireless connection system, including a plurality of image forming apparatuses capable of network connectivity, and an electronic apparatus to form a first link with an Access Point (AP) and to search to find at least one image forming apparatus not connected to the AP from among the plurality of image forming apparatuses and to transmit AP information corresponding to the AP to the at least one image forming apparatus such that the at least one image forming apparatus forms a second link with the AP.

The electronic apparatus may verify whether the image forming apparatus is connectable to the AP corresponding to the received AP information prior to transmitting the AP information to the image forming apparatus.

The electronic apparatus may perform the search by checking wireless connection information included in at least one of Information Element (IE) data and registration information of the at least one image forming apparatus.

The image forming apparatus may transmit its own registration information to the electronic device in response to a user pressing a button on the image forming apparatus.

The button may be a WiFi Protected Setup (WPS) button.

The first and second links may each correspond to a different network.

The AP information may include at least one of Service Set Identifier (SSID), network key information, and security information.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 5 is a view provided to explain an AP connecting method using an electronic apparatus and an image forming apparatus of the present general inventive concept;

DETAILED DESCRIPTION OF THE PREFERRED EMBODIMENTS

Figure 1:
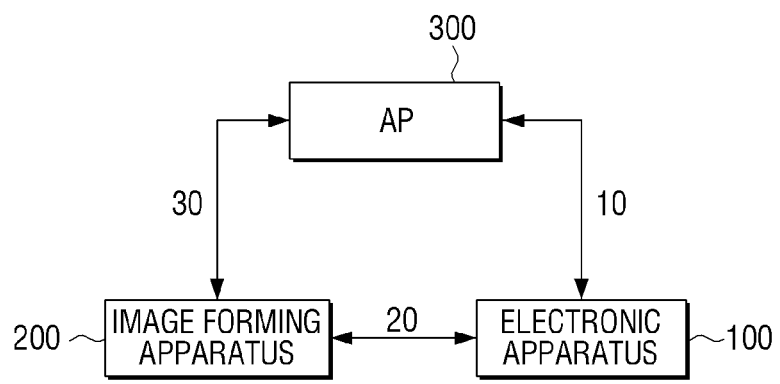
FIG. 1 is a view illustrating a wireless connection system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

It should be observed the method steps and system components have been represented by conventional symbols in the figure, showing only specific details which are relevant for an understanding of the present disclosure. Further, details may be readily apparent to person ordinarily skilled in the art may not have been disclosed. In the present disclosure, relational terms such as first and second, and the like, may be used to distinguish one entity from another entity, without necessarily implying any actual relationship or order between such entities.

FIG. 1 is a view illustrating a wireless connection system according to an exemplary embodiment of the present general inventive concept. The wireless connection system illustrated in FIG. 1 includes an electronic apparatus 100, an image forming apparatus 200, and an Access Point (AP) 300.

The electronic apparatus 100 may include a personal computer PC, notebook PC, mobile phone, smart phone, PMP, MP3, etc., which may use more than two communication networks. Herein, the communication network is a network that forms a connection with an external network. Different networks include networks that are separated from one another physically and with respect to their service. For example, the first communication network may be wireless LAN or wired LAN, the second communication network may be WiFi Direct, Bluetooth, Soft AP, Ad-hoc mode, etc. The third communication network may be wireless LAN. Herein, the WiFi Direct may form connection with a mobile apparatus or an electronic apparatus having WiFi function without a wireless sharer.

SoftAP is short for "Software enabled Access Point." While a Wireless Access Point (WAP) is specifically made only to work as an Access Point, SoftAP is used to make a wireless client antenna work as either the Access Point, or the client. The advantage of SoftAP is the use of a regular cellphone, for example, with a client antenna and data connection as an Access Point to serve other wireless devices that do not have a data connection otherwise. The wireless devices in the vicinity of the SoftAP enabled device, which may not have the Internet access directly, can use the Internet through the cellphone whose SoftAP is enabled. This is called tethering.

Specifically, the electronic apparatus 100 may form a link 10 with the AP 300 via the first communication network, and may be connected to an external apparatus of a wireless connection system (for example, Internet network) through the AP 300. Herein, the first communication network may use LAN method such as wired LAN or wireless LAN, etc.

Meanwhile, the image forming apparatus 200 is an apparatus that generates, prints, receives, transmits, etc. image data, and examples of the image forming apparatus may include a printer, scanner, copy machine, fax machine, and MFP that integrates all the functions of these apparatuses, but is not limited thereto.

The image forming apparatus 200 illustrated in FIG. 1 may not be connected to a wireless network, that is, the image forming apparatus 200 may not be connected any AP. The image forming apparatus 200 may transmit Information Element (IE) data through Soft AP, or may transmit its own apparatus registration information through WiFi Direct. Accordingly, the electronic apparatus 100 may receive the IE data transmitted from the image forming apparatus 200, or may receive the apparatus registration information. Herein, the operation of transmitting its own apparatus registration information through WiFi Direct may be performed when a user presses a WiFi Protected Setup (WPS) button of the image forming apparatus 200 if necessary.

The electronic apparatus 100 may check wireless connection state information included in the IE data or the apparatus registration information, and search to find the image forming apparatus 200 that is not connected to a wireless network. In addition, the electronic apparatus 100 may form a link 20 with the image forming apparatus 200 via the second communication network, and transmit AP information to the image forming apparatus 200. Herein, the second communication network may be WiFi Direct, Bluetooth, Soft AP, Ad-hoc mode, etc. The AP information may include at least one of Service Set Identifier (SSID), network key information and security information, but is not limited thereto, and is necessary to establish a wireless connection with respect to the AP 300.

Meanwhile, before transmitting the AP information to the image forming apparatus 200, the electronic apparatus 100 may check (i.e., verify) whether it is possible for the image forming apparatus 100 to connect to the AP 300 corresponding to the AP information, and if it is possible, may transmit the AP information to the image forming apparatus 200.

The image forming apparatus 200 may form a link 30 to the AP 300 via the third communication network using the AP information received from the electronic apparatus 100. Herein, it is desirable that the third communication network is Wireless LAN. Accordingly, the third communication network may be the same as or different from the first communication network.

As such, if the image forming apparatus 200 forms a link 30 with the AP 300, the electronic apparatus 100 and the image forming apparatus 200 may form links 10 and 30, respectively through the AP 300. Accordingly, the electronic apparatus 100 may transmit print data to the image forming apparatus 200 through the links 10 and 30. Specific operations and configurations of the electronic apparatus 100 and the image forming apparatus 200 will be described with respect to FIGS. 2 and 3.

The AP 300 relays the electronic apparatus 100 and the image forming apparatus 200. Specifically, the AP 300 may form the link 10 with the electronic apparatus 100 via the first communication network, and may form the link 30 with the image forming apparatus 200 via the third communication network. In this state, if print data is received from the electronic apparatus 100, the AP 300 may transmit the received print data to the image forming apparatus 200 through the links 10 and 30.

As such, the wireless connection system according to FIG. 1 transmits AP information that is necessary to connect the electronic apparatus 100 and the AP 300 to the image forming apparatus 200 and thus, even if a user does not know an AP connection method or AP information, the user may connect the image forming apparatus 200 to the AP 300.

Meanwhile, in the above description with respect to FIG. 1, the electronic apparatus 100 is connected to one image forming apparatus 200, but the electronic apparatus 100 may be connected to a plurality of image forming apparatuses 200 through the AP 300, and a plurality of electronic apparatuses 100 may be connected to one image forming apparatus 200.

Figure 2:
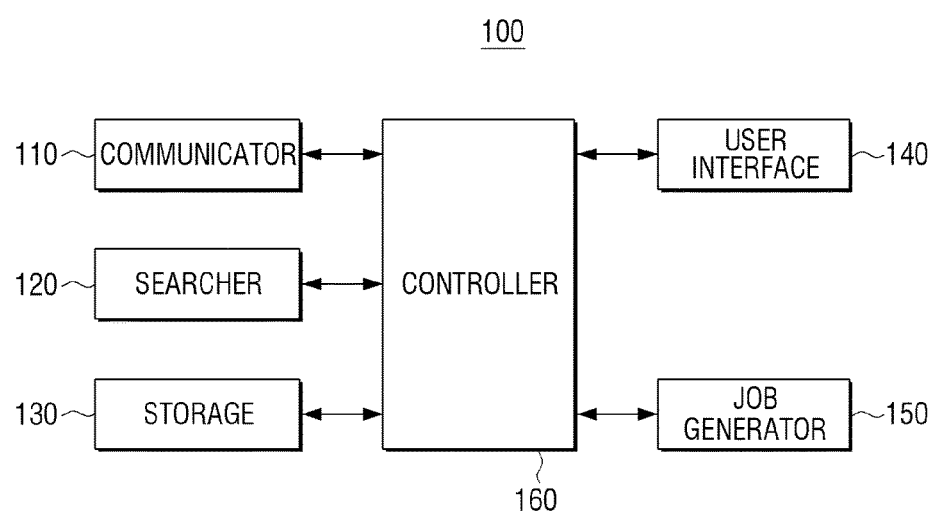
FIG. 2 is a block diagram illustrating configuration of an electronic apparatus according to an exemplary embodiment of the present general inventive concept.

FIG. 2 is a block diagram illustrating configuration of an electronic apparatus 100 according to an exemplary embodiment of the present general inventive concept. Referring to FIG. 2, the electronic apparatus 100 includes a communicator 110, a searcher 120, a storage 130, a user interface 140, and a controller 160.

The communicator 110 may form a link with the AP 300 though a wireless LAN method or a wired LAN method.

The searcher 120 searches to find the image forming apparatus 200 that is not connected to a wireless network.

According to an exemplary embodiment, the searcher 120 scans Soft AP of at least one image forming apparatus around the electronic apparatus 200 at predetermined time intervals, and receives IE data from the scanned Soft AP. The IE data includes device type information, device model name, wireless connection state, and Soft AP information, but is not limited thereto.

Herein, the device type information refers to information that indicates the type of device such as "printer", and the device model name refers to model information such as "Samsung SL-462XX".

In addition, the model connection state information refers to information that indicates a wireless connection state with respect to the image forming apparatus 200. If the image forming apparatus 200 does not have any history of being connected to a wireless network, or is not currently connected to a wireless network (for example, the AP 300), the wireless connection state information may be "New Device". However, "New Device" is an example of wireless connection state information, and the wireless connection state information is not limited thereto. That is, the wireless connection state information may be displayed using other methods. If the image forming apparatus 200 is connected to a predetermined wireless network, the wireless connection state information may not have any value, or may include AP identification information of the corresponding wireless network. Alternatively, if the image forming apparatus 200 is connected to a predetermined wireless network, a wireless connection state information item may not be included in the IE data.

The Soft AP information refers to information that is required to be connected to Soft AP included in the image forming apparatus 200, and may be network key information and security information of the Soft AP.

The searcher 120 may check wireless connection state information included in the IE data, and search the image forming apparatus 200 that is not connected to a wireless network from among one or more image forming apparatuses. Specifically, if the wireless connection state information in the IE data indicates "New Device", the searcher 120 may search the image forming apparatus 200 corresponding to the IE data.

According to another exemplary embodiment of the present general inventive concept, the searcher 120 performs WiFi Direct communication with respect to at least one image forming apparatus, and receives apparatus registration information from at least one image forming apparatus. The apparatus registration information includes device type information, device model name, and wireless connection state information. Herein, the wireless connection state information may not be a separate item from the device type information and the device model name and instead, may both be included in the apparatus registration information as part of the device type information and the device model name. For example, "Printer," which indicates device type information, and "New Device," which indicates wireless connection state information, may be arranged to read "Printer-New Device".

The searcher 120 may check wireless connection state information included in apparatus registration information to search to find the image forming apparatus 200 that is not connected to a wireless network from among one or more image forming apparatuses. Specifically, if "New Device" is displayed in wireless connection state information included in apparatus registration information, the searcher 120 may search to find the image forming apparatus 200 corresponding to the apparatus registration information.

The storage 130 stores a program to search the image forming apparatus 200. For example, the program may be a Wireless Connection Manger Program. The operation of the searcher 120 may be activated by the operation of the program.

The storage 130 stores AP information. Specifically, the storage 130 may store only AP information regarding the AP 300, or may further store AP information regarding other APs. Herein, the AP information includes at least one of SSID, network key information and security information, which is necessary to perform AP connection. The storage 130 may include a storage medium of the electronic apparatus 100 and an external storage medium, such as a removable disk including a USB memory, a flash memory, etc., a storage medium connected to a photographing apparatus, a web server via network, etc., but is not limited thereto.

The user interface 140 may include a plurality of apparatuses through which a user may set or select various functions supported by the electronic apparatus, and may display various information provided by the electronic apparatus 100. The user interface 140 may include an apparatus that can perform input and output operations simultaneously, such as a touch screen, or may include an apparatus that combines the functions of a mouse and a monitor.

The user interface 140 may display a user interface screen to inquire whether the image forming apparatus 200 searched by the searcher 120 should be connected to the AP 300. The user interface 140 may receive a user command to connect the image forming apparatus 200 to the AP 300 according to a user selection.

If AP information regarding a plurality of APs is stored in the storage 130, the user interface 140 may display a user interface screen to receive one AP from among a plurality of AP lists.

Meanwhile, the user interface 140 receives a print command. Specifically, the user interface 140 may display a plurality of print files, and receive a print command with respect to at least one of the displayed print files.

A job generator 150 generates print data. Specifically, the job generator 150 may generate print data regarding a file to be printed by a user (for example, image file and document file). Herein, the print data may be data in a printer language such as PostScript (PS), Printer Control Language (PCL), etc., and if the image forming apparatus 200 supports direct printing, the print data may be a file itself, such as PDF, XPS, BMP, JPG, etc., but is not limited thereto.

The controller 160 controls each element of the electronic apparatus 100. Specifically, the controller 160 activates the operation of the searcher 120 by driving a wireless connection management program stored in the storage 130. That is, the controller 160 controls the searcher 120 to search the image forming apparatus 200.

The controller 160 may keep operating the wireless connection management program while the power of the electronic apparatus 100 is turned on. In addition, the controller 160 may operate the wireless connection management program temporarily according to a user command.

If the image forming apparatus 200 is searched by the searcher 120, the controller 160 controls the user interface 140 to display a user interface screen to inquire whether to connect the image forming apparatus 200 to the AP 300.

If a user command to connect the image forming apparatus 200 to the AP 300 is received, the controller 160 releases a link with the AP 300, and controls the communicator 110 to form a link with the image forming apparatus 200.

For example, if the searcher 120 searches Soft AP of the image forming apparatus 200 and receives IE data, the controller 160 may control the communicator 110 to connect to the Soft AP of the image forming apparatus 200 using Soft AP information included in the IE data. However, this is only an example, and the communicator 110 may be connected to the image forming apparatus 200 using WiFi Direct, Bluetooth, Ad-hoc mode, etc. as well as Soft AP.

The controller 160 checks whether it is possible to connect the image forming apparatus 300 to the AP 300 that is set as a basic AP, and if it is possible, controls the communicator 110 to transmit AP information stored in the storage 130 to the image forming apparatus 200.

In addition, if it is impossible to connect the image forming apparatus 200 to the AP 300, the controller 160 may control the user interface 140 to display a plurality of AP lists. If an AP that is connectable to the image forming apparatus 200 is selected by a user from among a plurality of AP lists, the controller 160 may control the communicator 110 to transmit AP information corresponding to the selected AP to the image forming apparatus 200.

The AP information is information that is necessary to establish a connection with the AP 300, and as this information is transmitted to the image forming apparatus 200, the image forming apparatus 200 may form a link with the AP 300. Accordingly, when the image forming apparatus 200 forms a link with the AP 300 using the AP information, the electronic apparatus 100 may communicate with the image forming apparatus 200 through the AP 300.

After transmitting the AP information to the image forming apparatus 200, the controller 160 may control the communicator 110 to release a link with the image forming apparatus 200, and form a link again with the AP 300.

After transmitting the AP information to the image forming apparatus 200, the electronic apparatus 100 may check whether the image forming apparatus 200 is connected to the AP 300 appropriately. Specifically, the controller 160 may receive apparatus identification information from the image forming apparatus 200 while a link is formed with respect to the image forming apparatus 200. Herein, the apparatus identification information may be an intrinsic value with respect to the image forming apparatus 200, and may be an MAC address or a Universally Unique Identifier (UUID). The apparatus identification information may not be received separately and instead, may be received along with IE data or apparatus registration information that is received in the process of searching the image forming apparatus 200.

After transmitting AP information to the image forming apparatus 200, the controller 160 searches to find at least one wireless communication apparatus that is connected to the AP 300. Subsequently, the controller 160 may confirm that the image forming apparatus 200 is connected to the AP 300 by searching the image forming apparatus 200 from among one or more wireless communication apparatuses using the apparatus identification information of the image forming apparatus 200.

If an apparatus having the apparatus identification information is not searched from among one or more wireless communication apparatuses, the controller 160 may control the user interface 140 to display a user interface screen to notify a user that the image forming apparatus 200 is not connected to the AP 300 appropriately. Accordingly, the user interface screen may include a message to inquire whether to reconnect the image forming apparatus 200 to the AP 300. If a user command to reconnect the image forming apparatus 200 to the AP 300 is received, the controller 160 may perform the operation of forming a link with the image forming apparatus 200 and transmitting the AP information again.

Meanwhile, the controller 160 may receive IP information from the image forming apparatus 200 through the AP 300. The controller 160 may generate a printer port (for example, a standard TCP/IP port) with respect to the image forming apparatus 200 that is connected to the AP 300 using the IP information, and install a printer driver with respect to the image forming apparatus 200. When the printer driver is installed, the port of the printer driver may be set to a printer port with respect to the image forming apparatus 200.

The printer driver may be searched inside the electronic apparatus 100 using IE data previously received from the image forming apparatus or a device model name included in apparatus registration information, or if the printer driver does not exist inside the electronic apparatus 100, the printer driver may be downloaded by connecting to a web server through the AP 300. Alternatively, the storage location of the printer driver may be input from a user, and the printer driver may be searched.

Meanwhile, if a file or a web page to be printed is received from a user, the controller 160 may transmit print data generated from the job generator 150 to the image forming apparatus 200 through the AP 300.

As such, the electronic apparatus 100 according to an exemplary embodiment transmits AP information that is necessary to connect the AP 300 wirelessly to the image forming apparatus 200, so even if a user does not know an AP connecting method or AP information, the user may connect the image forming apparatus 200 to the AP 300 automatically.

Figure 3:
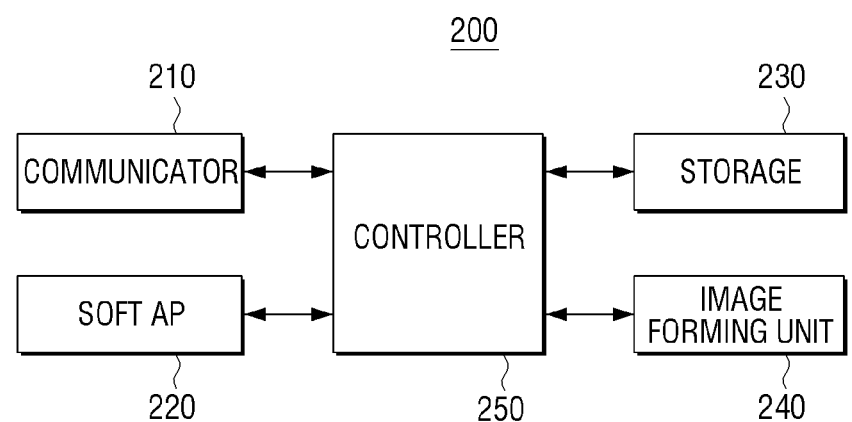
FIG. 3 is a block diagram illustrating configuration of an image forming apparatus according to an exemplary embodiment of the present general inventive concept.

FIG. 3 is a block diagram illustrating configuration of an image forming apparatus 200 according to an exemplary embodiment of the present general inventive concept. Referring to FIG. 3, the image forming apparatus 200 includes a communicator 210, a Soft AP 220, a storage 230, an image forming unit 240, and a controller 250. Herein, the image forming apparatus 200 may be copy machine, printer, and fax machine that support a plurality of communication networks, an MFP that performs the functions of the above apparatuses in a single apparatus, but is not limited thereto.

The communicator 210 is an element to connect the image forming apparatus 200 to an external apparatus. The communicator 210 may be connected not only through Local Area Network (LAN) and Internet network but also through a wireless communication method (for example, wireless communication such as WiFi Direct, Bluetooth, GSM, UMTS, LTE, WiBRO, etc.).

The Soft AP 220 is a software module that allows the image forming apparatus 200 to serve as an AP.

The storage 230 stores a program to drive the image forming apparatus 200, and may IE data, apparatus registration information and apparatus identification information with respect to the image forming apparatus 200.

The image forming unit 240 forms an image. Specifically, the image forming unit 240 may form an image with respect to print data that is received through the communicator 210. As illustrated in FIG. 3, only the image forming unit 250 that performs a print job with respect to print data is illustrated, but if the image forming apparatus 200 is an MFP that may perform a scanning job, a fax job, etc., the image forming apparatus 200 may further include an element to perform a scanning job and an element to perform a fax transmission/reception job.

The controller 250 controls each element of the image forming apparatus 200.

If the image forming apparatus 200 is not connected to a wireless network, that is, if the image forming apparatus 200 is not connected to any AP, the controller 250 may control the Soft AP 220 to transmit IE data through the communicator 210, or control the communicator 210 to transmit apparatus registration information using WiFi Direct communication.

First of all, if the apparatus setting value of the image forming apparatus 200 is a factory default, if there is no history of being connected to a wireless network, or if a wireless network is not currently connected, the controller 250 determines that the image forming apparatus 200 is not connected to a wireless network. Accordingly, the controller 250 may control the Soft AP 220 to transmit IE data including wireless connection state information that indicates that a wireless network is not connected, and may control the communicator 210 to transmit apparatus registration information including wireless connection state information. In this case, the IE data or the apparatus registration information is not transmitted to a specific apparatus and instead, may be transmitted to unspecified apparatuses that are located within scanning distance of the Soft AP 220 or WiFi Direct communication distance.

Meanwhile, after transmitting the IE data or the apparatus registration information, the communicator 210 may form a link with the electronic apparatus 100 upon a request from the electronic apparatus 100. Once a link is formed with the electronic apparatus 100, the controller 250 may transmit apparatus identification information of the image forming apparatus 200 such as MAC address or UUID to the electronic apparatus 100.

When AP information is received through the communicator 210, the controller 250 may form a link with the AP 300 corresponding the AP information using the AP information. That is, the image forming apparatus 200 can be connected to the AP 300. In this case, when the AP information is received through the communicator 210, the communicator 210 may release a link with the electronic apparatus 100. Herein, the AP information is at least one of SSID, network key information and security information, and is information that is necessary to establish a wireless connection with the AP 300.

When the image forming apparatus 200 is connected to the AP 300, the image forming apparatus 200 may communicate with the electronic apparatus 100 through the AP 300. In addition, although not illustrated in FIG. 3, the image forming apparatus 200 may communicate with other wireless communication apparatuses that are connected to the AP 300 as well as the electronic apparatus 100.

Meanwhile, if print data is received from the electronic apparatus 100 through the AP 300, the controller 250 controls the image forming unit 240 to print the print data.

As such, the image forming apparatus 200 according to FIG. 3 receives AP information from the electronic apparatus 100 and connects to the AP 300 using the AP information, so user convenience can be improved due to the automatic AP connection.

Figure 4A:
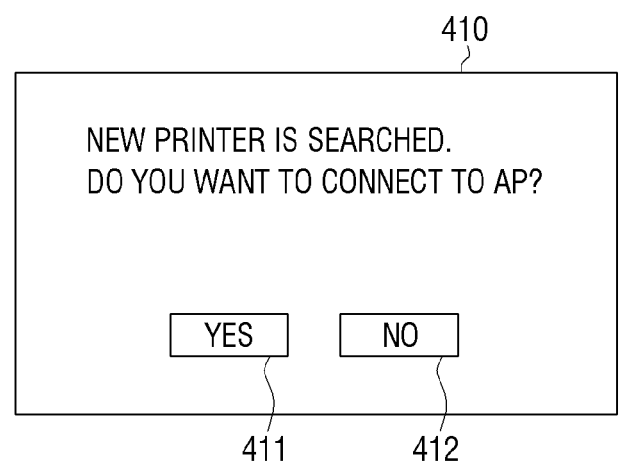
FIGS. 4A and 4B are views illustrating various examples of a user interface screen that is displayed on an electronic apparatus of the present general inventive concept.
Figure 4B:
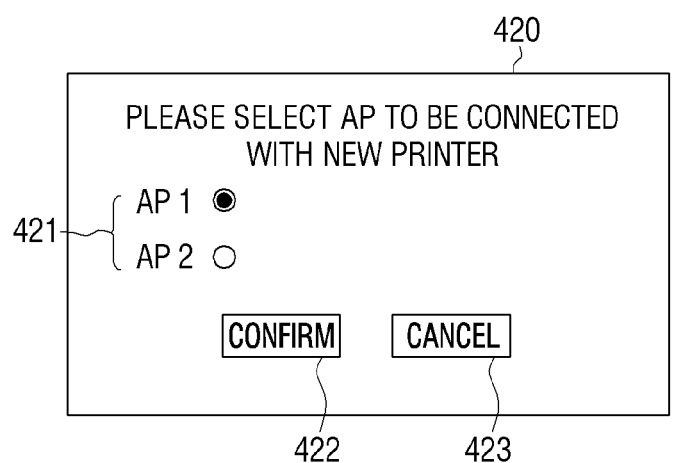

FIGS. 4A and 4B are views illustrating various examples of a user interface screen that is displayed on an electronic apparatus.

When a new printer that is not connected to a wireless network is searched, the electronic apparatus 100 displays a user interface screen 410 to inquire whether to connect the searched new printer to an AP as illustrated in FIG. 4A. If a user selects a "yes' area 411 on the user interface screen 410, the electronic apparatus 100 may form a link with the searched new printer and transmit AP information to the new printer. Alternatively, if the user selects a "no" area 412, the electronic apparatus 100 does not form a link with the new printer.

If the electronic apparatus 100 is connected to a plurality of APs and a user selects the "yes" area 411 on the user interface screen 410, the electronic apparatus 100 displays a user interface screen 420 illustrated in FIG. 4B.

The user interface screen 420 includes a list of a plurality of APs 421 that are connected to the electronic apparatus 100. If a user selects one AP on the AP list 421 and selects a "confirm" area 422, the electronic apparatus 100 may form a link with the selected AP and transmit AP information to the new printer. If the user selects a "cancel" area 423, the electronic apparatus 100 does not form a link with the new printer.

FIG. 5 is a view provided to explain an AP connecting method using an electronic apparatus and an image forming apparatus. Referring to FIG. 5, the electronic apparatus 100 forms a link with the AP 300 (S510). Subsequently, the image forming apparatus 200 transmits data including wireless connection state information through the Soft AP 220 while not being connected to a wireless network (S515). Herein, the data including wireless connection state information may be IE data or apparatus registration information.

The electronic apparatus 100 searches to find the image forming apparatus 200 that is not connected to a wireless network (S520). In this case, the electronic apparatus 100 may receive IE data transmitted from Soft AP by scanning Soft APs around the electronic apparatus 100, or may receive apparatus registration information of the image forming apparatus 200 through WiFi Direct communication. In addition, the image forming apparatus 200 may be searched by checking IE data or wireless connection state information included in apparatus registration information.

Meanwhile, when the image forming apparatus 200 is searched, the electronic apparatus 100 releases a link with the AP 300 (S525), and forms a link with the image forming apparatus 200 (S530). Subsequently, the electronic apparatus 100 transmits AP information that is necessary to connect to the AP 300 with the image forming apparatus 200 (S535). As such, if the AP information is transmitted to the image forming apparatus 200, the electronic apparatus 100 releases a link with the image forming apparatus 200 and forms a link with the AP 300 again (S545).

The image forming apparatus 200 forms a link with the AP 300 using the AP information received from the electronic apparatus 100 (S550). Accordingly, the electronic apparatus 100 and the image forming apparatus 200 may communicate with each other through the AP 300.

Meanwhile, if a print command is received from a user, the electronic apparatus 100 transmits print data to the AP 300 (S555). Subsequently, the AP 300 transmits thee print data to the image forming apparatus 200 (S560). That is, the electronic apparatus 100 may transmit the print data to the image forming apparatus 200 through the AP 300. Accordingly, the image forming apparatus prints the print data (S565).

Figure 6:
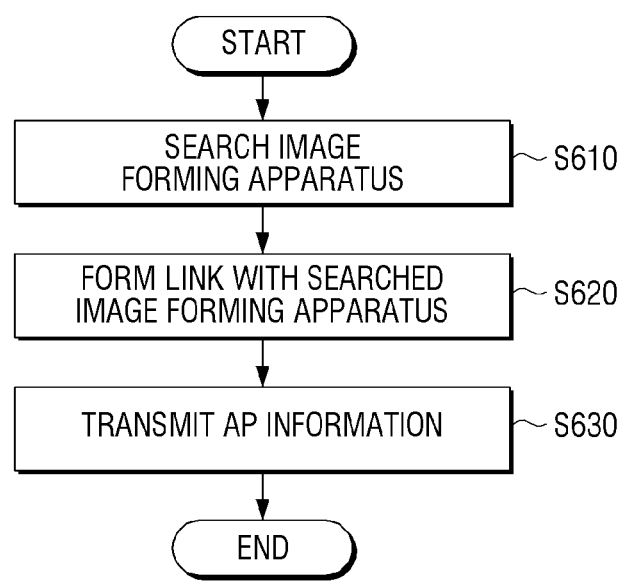
FIG. 6 is a flowchart provided to explain a method of supporting wireless connection of an electronic apparatus according to an exemplary embodiment of the present general inventive concept.

FIG. 6 is a flowchart provided to explain a method of supporting wireless connection of an electronic apparatus according to an exemplary embodiment of the present general inventive concept. Referring to FIG. 6, the electronic apparatus 100 searches to find the image forming apparatus 200 that is not connected to a wireless network (S610). The state where the image forming apparatus 200 is not connected to a wireless network refers to a state where the image forming apparatus 200 is not connected to any AP.

The electronic apparatus 100 forms a link with the searched image forming apparatus 200 (S620). In this case, the electronic apparatus 100 may form a link with the image forming apparatus 200 using a communication network such as WiFi Direct, Bluetooth, Soft AP, Ad-hoc mode, etc., but is not limited thereto.

The electronic apparatus 100 transmits AP information to the image forming apparatus (S630). The AP information is information that is necessary to establish a connection with the AP 300. Accordingly, the electronic apparatus 100 may support wireless connection of the image forming apparatus 200 by transmitting the AP information to the image forming apparatus 200.

Figure 7:
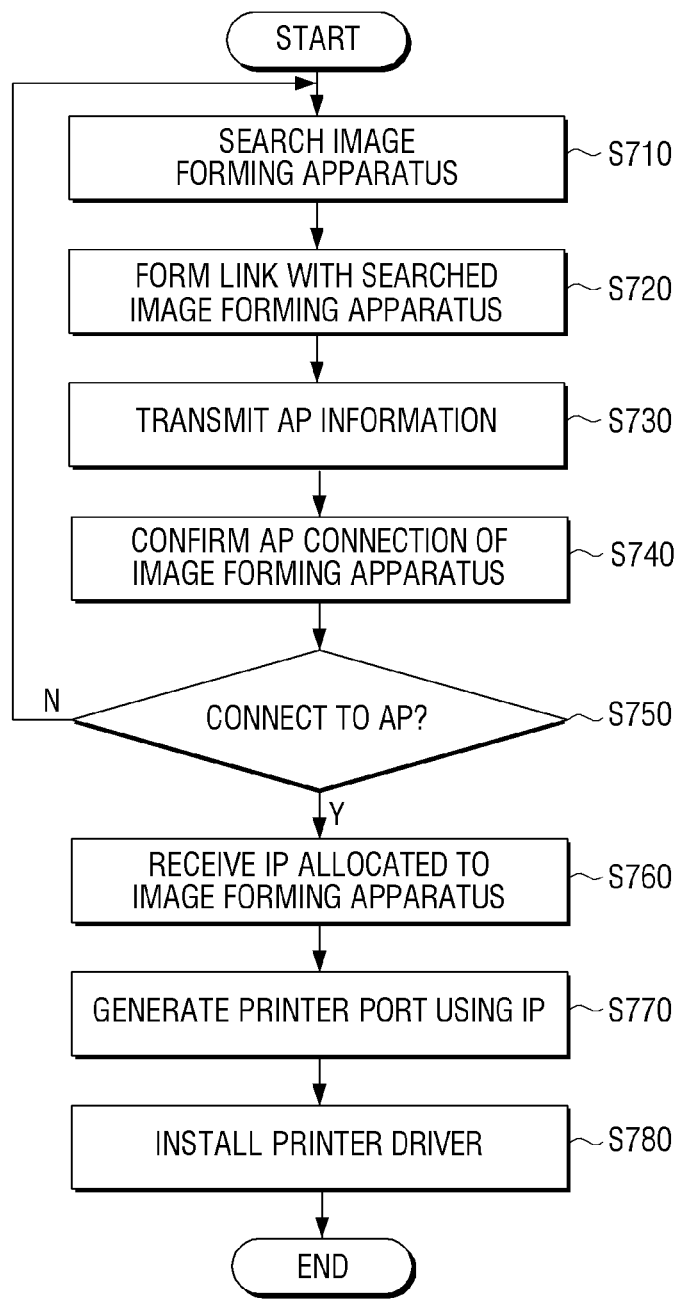
FIG. 7 is a flowchart provided to explain a method of supporting wireless connection of an electronic apparatus according to another exemplary embodiment of the present general inventive concept.

FIG. 7 is a flowchart provided to explain a method of supporting wireless connection of an electronic apparatus according to another exemplary embodiment of the present general inventive concept. Referring to FIG. 7, the electronic apparatus 100 searches to find the image forming apparatus 200 that is not connected to a wireless network (S710), and forms a link with the searched image forming apparatus 200 (S720). In this case, once a link with the image forming apparatus 200 is formed, the electronic apparatus 100 may release the link with the AP 300.

The electronic apparatus 100 transmits AP information to the image forming apparatus 200 so that the image forming apparatus 200 is connected to the AP 300 (S730). After transmitting the AP information, the electronic apparatus 100 may release the link with the image forming apparatus 200 and form a link with the AP 300 again.

After transmitting the AP information, the electronic apparatus 100 checks whether the image forming apparatus 200 is connected to the AP 300 appropriately (S740). If the image forming apparatus 200 is connected to the AP 300 appropriately (S750), the electronic apparatus 100 receives an IP allocated to the image forming apparatus 200 through the AP 300 (S760). If the image forming apparatus 200 is connected to the AP 300, the image forming apparatus 200 may be allocated with an IP from the AP 300.

The electronic apparatus 100 generates a printer port using the received IP (S770), and installs a printer driver to operate the image forming apparatus 200 (S780).

Figure 8:
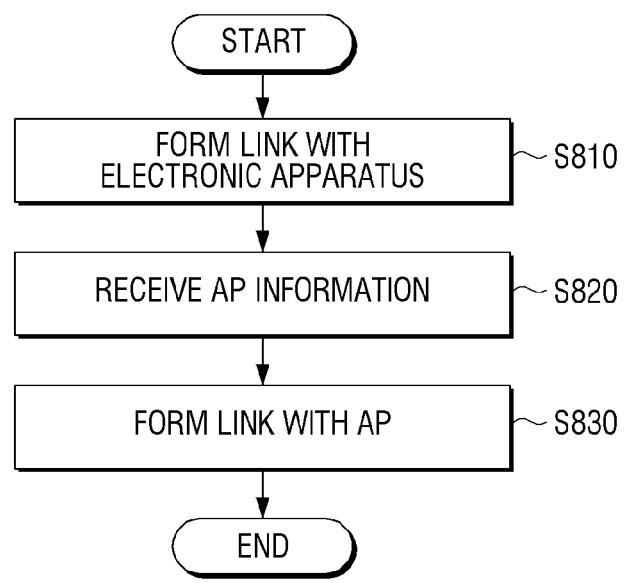
FIG. 8 is a flowchart provided to explain a method of wireless connection of an image forming apparatus according to an exemplary embodiment of the present general inventive concept.

FIG. 8 is a flowchart provided to explain a method of wireless connection of an image forming apparatus according to an exemplary embodiment of the present general inventive concept. Referring to FIG. 8, if a link is formed with the electronic apparatus 100 (S810), the image forming apparatus 200 receives AP information from the electronic apparatus 100 (S820). The AP information may be at least one of SSID, network key information, and security information, but is not limited thereto.

The image forming apparatus 200 forms a link with the AP 300 using the AP information (S830).

As such, according to various exemplary embodiments of the present general inventive concept, if the image forming apparatus 200 that is not connected to a wireless network exists, wireless connection may be supported through the electronic apparatus 100 and thus, the image forming apparatus 200 can be connected to the AP 300 without requiring a user to input AP information to the image forming apparatus 200.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The foregoing embodiments, features, and utilities are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of establishing a wireless connection of an image forming apparatus by an electronic apparatus, comprising:

performing, by the electronic apparatus:

wirelessly connecting a wireless communicator of the electronic apparatus with an Access Point (AP) of a wireless network;

obtaining AP information of the AP of the wireless network that is necessary for an image forming apparatus to establish the wireless connection with the AP of the wireless network;
searching to identify an image forming apparatus that is not connected to the AP of the wireless network;
in response to identification in the searching of an image forming apparatus that is not connected to the AP of the wireless network, disconnecting the wireless communicator of the electronic apparatus from the AP of the wireless network, to wirelessly connect the wireless communicator of the electronic apparatus with the identified image forming apparatus; and
transmitting, using the wireless communicator of the electronic apparatus connected with the identified image forming apparatus, the obtained AP information to the identified image forming apparatus, to thereby cause the identified image forming apparatus to establish the wireless connection with the AP of the wireless network using the AP information transmitted from the electronic apparatus.

2. The method as claimed in claim 1, wherein the searching to identify an image forming apparatus comprises:
scanning for a Soft AP of at least one image forming apparatus at predetermined intervals, and receiving Information Element (IE) data from the scanned Soft AP; and
checking wireless connection state information included in the IE data to determine whether the at least one image forming apparatus is connected to the wireless network.

3. The method as claimed in claim 1, wherein the searching to identify an image forming apparatus comprises:
performing WiFi Direct communication with at least one image forming apparatus;
receiving apparatus registration information from the at least one image forming apparatus that responds to the performing the WiFi Direct communication; and
searching to identify an image forming apparatus that is not connected to the AP of the wireless network among the at least one image forming apparatus using wireless connection state information included in the apparatus registration information.

4. The method as claimed in claim 1, wherein the transmitting, using the wireless communicator of the electronic apparatus connected with the identified image forming apparatus, the obtained AP information to the identified image forming apparatus comprises
displaying a user interface screen to inquire whether to connect the identified image forming apparatus to the AP of the wireless network; and
in response to receiving a user command to connect the identified image forming apparatus to the AP of the wireless network through the user interface screen, transmitting, using the wireless communicator of the electronic apparatus connected with the identified image forming apparatus, the obtained AP information to the identified image forming apparatus.

5. The method as claimed in claim 1, further comprising:
when the obtained AP information is transmitted to the identified image forming apparatus, disconnecting the wireless communicator of the electronic apparatus from the identified image forming apparatus and wirelessly connecting the wireless communicator of the electronic apparatus with the AP of the wireless network again.

6. The method as claimed in claim 1, further comprising:
receiving apparatus identification information from the identified image forming apparatus and storing the received apparatus identification information;
after the transmitting the obtained AP information to the identified image forming apparatus, searching at least one wireless communication apparatus that is connected to the AP of the wireless network; and
checking whether the identified image forming apparatus is connected to the AP of the wireless network by determining whether the at least one wireless communication apparatus includes the identified image forming apparatus using the stored apparatus identification information.

7. The method as claimed in claim 6, further comprising:
when IP information is received from the identified image forming apparatus, generating a printer port for the identified image forming apparatus using the received IP information and installing a printer driver for the identified image forming apparatus.

8. The method as claimed in claim 6, further comprising:
when a print command for print data is received, transmitting the print data to the identified image forming apparatus that is connected to the AP of the wireless network.

9. The method as claimed in claim 1, wherein the wirelessly connecting the wireless communicator of the electronic apparatus with the identified image forming apparatus comprises:
connecting the wireless communicator of the electronic apparatus with the identified image forming apparatus using one from among WiFi Direct, Bluetooth, Soft AP, and ad-hoc mode.

10. The method as claimed in claim 1, wherein the AP information includes at least one from among Service Set Identifier (SSID), network key information and security information.

11. An electronic apparatus, comprising:
a memory to store access point (AP) information of an AP of a wireless network that is necessary to establish a wireless connection with the AP of the wireless network;
a wireless communicator;
at least one hardware processor to:
search to identify an image forming apparatus that is not connected to the AP of the wireless network;
control, in response to identification of an image forming apparatus that is not connected to the AP of the wireless network, the wireless communicator to disconnect from the AP of the wireless network, to wirelessly connect the wireless communicator with the identified image forming apparatus; and
control the wireless communicator to transmit the AP information to the identified image forming apparatus, thereby to cause the identified image forming apparatus to establish the wireless connection with the AP of the wireless network using the AP information transmitted from the electronic apparatus.

12. The apparatus as claimed in claim 11, wherein the at least one hardware processor is to, when a Soft AP of at least one image forming apparatus is scanned through the wireless communicator at predetermined intervals, receive IE data from the scanned Soft AP and check wireless connection state information included in the IE data to determine whether the at least one image forming apparatus is connected to the wireless network.

13. The apparatus as claimed in claim 11, wherein the at least one hardware processor is to, when apparatus registration information is received from at least one image forming apparatus performing WiFi Direct communication, search to identify an image forming apparatus that is not connected to the AP of the wireless network among the at least one image forming apparatus using wireless connection state information included in the apparatus registration information.

14. The apparatus as claimed in claim 11, further comprising:
a user interface to, when the wireless communicator is wirelessly connected with the identified image forming apparatus, display a user interface screen to inquire whether to connect the identified image forming apparatus to the AP,
wherein the at least one hardware processor is to, when the user interface receives a user command to connect the identified image forming apparatus to the AP, control the wireless communicator to transmit the AP information to the identified image forming apparatus.

15. The apparatus as claimed in claim 11, wherein the at least one hardware processor is to, when the AP information is transmitted to the identified image forming apparatus, control the wireless communicator to disconnect from the identified image forming apparatus and to wirelessly connect with the AP again.

16. The apparatus as claimed in claim 11, wherein
the wireless communicator receives apparatus identification information from the identified image forming apparatus, and
the at least one hardware processor is to, after controlling the wireless communicator to transmit the AP information to the identified image forming apparatus, control the wireless communicator to search at least one wireless communication apparatus that is connected to the AP of the wireless network, and check whether the identified image forming apparatus is connected to the AP of the wireless network by determining whether the at least one wireless communication apparatus includes the identified image forming apparatus using the apparatus identification information.

17. The apparatus as claimed in claim 11, wherein the at least one hardware processor is to, when IP information is received from the identified image forming apparatus, generate a printer port for the identified image forming apparatus using the received IP information and install a printer driver for the identified image forming apparatus.

18. The apparatus as claimed in claim 11, wherein the at least one hardware processor is to
generate print data, and
when a print command for the print data is received, control the wireless communicator to transmit the print data to the identified image forming apparatus that is connected to the AP of the wireless network.

19. The apparatus as claimed in claim 11, wherein the AP information includes at least one from among SSID, network key information and security information.

20. A method of establishing a wireless connection to a wireless network through an access point (AP) of the wireless network for an image forming apparatus that is not connected to the access point (AP) of the wireless network, comprising:
by the image forming apparatus,
storing wireless connection state information indicating whether the image forming apparatus is connected to the AP;
establishing a communication connection to an electronic apparatus according to a request from the electronic apparatus to establish the communication connection, causing the electronic apparatus to determine the image forming apparatus is not connected to the AP according to the stored wireless connection state information;
receiving from the electronic apparatus information of the AP necessary for the image forming apparatus to establish the wireless connection with the AP; and
establishing a wireless link with the AP using the received AP information so that the image forming apparatus is wirelessly connected to the wireless network.

21. The method as claimed in claim 20, wherein the communication connection is a Soft AP, the method further comprising:
by the image forming apparatus, transmitting, to the electronic apparatus, IE data including the wireless connection state information with respect to the image forming apparatus through the Soft AP.

22. The method as claimed in claim 20, wherein the communication connection is WiFi Direct communication, the method further comprising:
by the image forming apparatus, transmitting, to the electronic apparatus, apparatus registration information including the wireless connection state information with respect to the image forming apparatus using the WiFi Direct communication connection.

23. The method as claimed in claim 20, wherein the AP information includes at least one from among SSID, network key information and security information.

24. An image forming apparatus, comprising:
at least one processor to,
store wireless connection state information indicating whether the image forming apparatus is connected to the AP;
establish a communication connection to an electronic apparatus according to a request from the electronic apparatus to establish the communication connection, causing the electronic apparatus to determine the image forming apparatus is not connected to the AP according to the stored wireless connection state information;
receiving from the electronic apparatus information of the AP necessary for the image forming apparatus to establish the wireless connection with the AP; and
establishing a wireless link with the AP using the received AP information so that the image forming apparatus is wirelessly connected to the wireless network.

25. The apparatus as claimed in claim 24, wherein the communication connection is a Soft AP, the at least one processor is to,
to transmit, to the electronic apparatus, IE data including the wireless connection state information with respect to the image forming apparatus through the SoftAP.

26. The apparatus as claimed in claim 24, wherein the communication connection is a WiFi Direct communication connection, the at least one processor is to transmit, to the electronic apparatus, apparatus registration information including wireless connection state information with respect to the image forming apparatus using the WiFi Direct communication connection.

* * * * *